June 16, 1936. A. H. PREY Re. 20,012

ROTARY BONDED ABRASIVE ARTICLES

Original Filed Dec. 1, 1933

INVENTOR.
ARTHUR H. PREY

BY R. C. Benner

ATTORNEY.

Reissued June 16, 1936

Re. 20,012

UNITED STATES PATENT OFFICE 20,012

ROTARY BONDED ABRASIVE ARTICLES

Arthur H. Prey, Niagara Falls, N. Y., assignor to The Carborundum Company, Niagara Falls, N. Y., a corporation of Pennsylvania Original No. 2,015,727, dated October 1, 1935, Serial No. 700,409, December 1, 1933. Application for reissue January 24, 1936, Serial No. 60,708. In Canada September 26, 1932

7 Claims. (Cl. 51—206)

Figure 1:
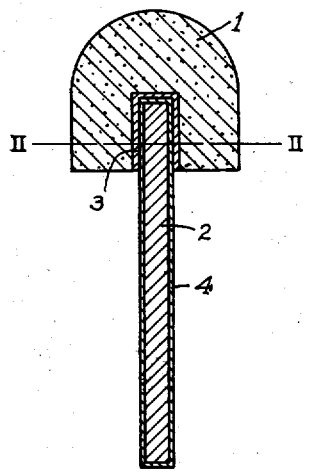

This invention relates to the manufacture of abrasive articles and particularly to those abrasive articles comprising a bonded abrasive shape mounted on a rotative spindle.

The object of the invention is to provide an improved article for abrasive purposes and a method of making the same.

This application is a continuation-in-part of my copending application Serial No. 569,723, filed October 19, 1931.

Certain arts and professions require bonded abrasive articles of such small sizes that they can be operated satisfactorily only when they have been mounted on metallic spindles adapted to fit into suitable chucks. Dentists use these mounted abrasive articles in grinding teeth, preparatory to such subsequent operations as filling or capping to prevent further decay of the teeth. Die and tool makers also find such mounted abrasive articles suitable for removing metal from small corners or crevices.

Inasmuch as experience has taught that the abrasive portion of such articles is best adapted to the purpose when made by a baking or kiln firing process, it has become customary to manufacture these abrasive portions and then, after they have been hardened by the heat, cement them to the desired types of spindles. These spindles are, as a general rule made of a type of steel known as drill rod steel and fabricated in a special manner to increase strength in the nose. It is not feasible to mold the abrasive portion onto the metallic spindle and then set the abrasive binder, because the baking temperatures of such binders is in a temperature range that is decidedly deleterious to the metals which, as above mentioned, are commercially available for this purpose.

The usual practice heretofore has been to provide the abrasive member with a hole of suitable size to receive a steel spindle and suitable quantity of cement for joining the abrasive member to the shaft. It also has been the practice to use a cold setting cement, such as a freshly made mixture of calcined cupric oxide and phosphoric acid, for the purpose of joining the abrasive member to the spindle.

This prior practice, however, has left much to be desired because of the abrasive member becoming detached from its spindle before it has done its full measure of grinding. Numerous cements have been tried for the purpose but it is the practice to use a cement of the oxyphosphate type such as a mixture of calcined cupric acid oxide and phosphoric acid, although sometimes even this type of cement has failed to hold the abrasive member onto the shaft the desired length of time.

I at first thought that the difficulty was due to the smoothness of the surface of the metal shaft and attempted to remedy the defective bond by roughening the portion of the shaft on which the abrasive member was to be mounted. I have found, however that by coating the shaft with certain metals and then using the above mentioned cement to attach the abrasive member, a remarkably tenacious bond is effected which will last until the last of the abrasive grain is worn off.

While a considerable number of theories have been suggested and examined to explain the phenomena underlying the improved results I obtain, the explanations so far advanced are not entirely satisfactory in explaining the mechanism whereby the results are obtained. However, I have observed certain indications of deterioration of the cement when applied directly to the steel shaft or to a nickel plated shaft, which I offer for what they are worth. For instance, I have noted that the cement immediately surrounding the steel shaft often is porous as though tiny bubbles had been present when the cement was soft.

Figure 2:
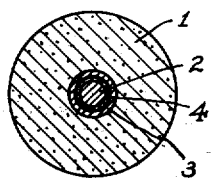

My invention will be better understood after a brief description of such an abrasive device; and for purposes of illustration I have shown a typical abrasive device of this type in the attached drawing in which:

Figure 1 is an enlarged cross-sectional view through the longitudinal axis of the spindle; and Figure 2 is an enlarged cross-sectional view through the plane II—II of Figure 1.

In the drawing, the abrasive member 1 is shown as attached to the spindle 2 by means of a suitable cement 3. The spindle 2 is shown with a coating 4 of a material that improves the bond over that obtained by cementing the member directly to the spindle 2.

Among the materials that I have found satisfactory for carrying out my invention are copper, chromium, cadmium, silver, gold, or other such material, and a dual plating of first copper and then nickel over the copper. Because copper is readily available at low cost and is easily applied and efficacious, I will describe my invention by referring specifically to the use of copper.

According to my invention the whole spindle, or the end of the spindle to be attached to the abrasive member and which may or may not be knurled as desired, is first cleaned with a caustic soda solution to remove grease and oil and then, upon scouring with clean, moistened pumice, washed with a dilute solution of hydrochloric acid.

When the spindle is free from grease, oil and other surface impurities, I coat it with copper. The copper coating may be applied by dipping the clean spindle in a solution of copper sulphate and sulphuric acid, but I prefer to coat the spindle by electroplating.

When the spindle, or that portion of the spindle that is to come into contact with the cement, is thoroughly coated with copper, it is washed and dried and is ready for use.

In joining the abrasive member (which, for the purpose of my invention may be of vitrified-bonded granules, resin-bonded granules or any other suitably bonded material) to the copper-coated shaft, I use a cement containing calcined cupric oxide and phosphoric acid in the ratio of approximately 30 grams of cupric oxide to 7 cubic centimeters of an aqueous solution containing 80% phosphoric acid. I quickly mix these materials to form a paste and then apply a small portion to the copper coated end of the spindle, and then insert the cement-coated end into the hole provided in the bonded abrasive member. The cement sets quickly and requires rapid manipulation from the time the copper and phosphoric acid are mixed until the bonded abrasive member is correctly positioned on the spindle. When the cement has set, the bonded abrasive member and the spindle are so firmly joined that the abrasive member may be used in severe service without danger of its becoming loose from the spindle.

While, as stated above, copper was given as the specific material for illustrative purposes, other materials also are efficacious. Among the other materials that may be used in practicing the invention are cadmium, gold, silver, nickel, and chromium.

Electroplating of the spindle forms a very convenient way of producing good adhesion to the bonded abrasive member, but I do not wish to be limited in my invention to this process, inasmuch as other methods of coating the spindle may be used without departing from my invention. One method of metal coating that has found wide use in the arts is carried out by means of an implement known as the Schoop gun. This device comprises an oxyacetylene torch, through which a metal wire is fed, and means for blowing the molten metal away from the flame and onto any object to which the gun is directed. By this means a tightly adhering coating of metal may be applied to a spindle or any desired portion of a spindle.

Having thus described my invention, I claim:

1. An abrasive article comprising a bonded abrasive article joined to a metallic spindle by a cement of the oxyphosphate type, said metallic spindle being coated with a previously applied metal film of the group consisting of copper, cadmium, nickel on copper, silver, gold and chromium where it comes in contact with the cement.

2. An abrasive article comprising a bonded abrasive article joined to a metallic spindle by a cement of the oxyphosphate type, said metallic spindle being knurled and being coated with a previously applied metal film of the group consisting of copper, cadmium, nickel on copper, silver, gold and chromium where it comes in contact with the cement.

3. An abrasive article comprising a bonded abrasive article joined to a metallic spindle by a cement consisting of a mixture of cupric oxide and phosphoric acid, said metallic spindle being coated with a previously applied metal film of the group consisting of copper, cadmium, silver, gold and chromium where it comes in contact with the cement.

4. An abrasive article comprising a bonded abrasive article joined to a metallic spindle by a cement consisting of a mixture of cupric oxide and phosphoric acid, said metallic spindle being knurled where it comes in contact with the cement and being coated with a previously applied metal film of the group consisting of copper, cadmium, silver, gold and chromium where it comes in contact with the cement.

5. An abrasive article comprising a bonded abrasive article joined to a metallic spindle by a cement of the oxyphosphate type, said metallic spindle being coated with a previously applied film of copper where it comes in contact with the cement.

6. An abrasive article comprising a bonded abrasive article joined to a metallic spindle by a cement of the oxyphosphate type, said metallic spindle being coated with a previously applied film of cadmium where it comes in contact with the cement.

7. An abrasive article comprising a bonded abrasive article joined to a metallic spindle by a cement of the oxyphosphate type, said metallic spindle being coated with a previously applied film of silver where it comes in contact with the cement.

ARTHUR H. PREY.